US012794813B2

(12) United States Patent
Braun

(10) Patent No.: US 12,794,813 B2
(45) Date of Patent: Nov. 10, 2026

(54) METHOD AND SYSTEM FOR CONTROLLING A TRANSMISSION OF DATA ASSIGNED TO DIFFERENT CLASSES OF TRAFFIC

(71) Applicant: SIEMENS MOBILITY GMBH, Munich (DE)

(72) Inventor: Thorsten Braun, Bubenreuth (DE)

(73) Assignee: Siemens Mobility GmbH, Munich (DE)

( * ) Notice: Subject to any disclaimer, the term of this patent is extended or adjusted under 35 U.S.C. 154(b) by 288 days.

(21) Appl. No.: 18/694,055

(22) PCT Filed: Aug. 30, 2022

(86) PCT No.: PCT/EP2022/074011
§ 371 (c)(1),
(2) Date: Mar. 21, 2024

(87) PCT Pub. No.: WO2023/046424
PCT Pub. Date: Mar. 30, 2023

(65) Prior Publication Data

US 2025/0150401 A1 May 8, 2025

(30) Foreign Application Priority Data

Sep. 21, 2021 (DE) .................... 10 2021 210 480.0

(51) Int. Cl.
*H04L 47/70* (2022.01)
*B61L 27/70* (2022.01)
(Continued)

(52) U.S. Cl.
CPC .............. *H04L 47/24* (2013.01); *B61L 27/70* (2022.01); *H04L 41/0896* (2013.01);
(Continued)

(58) Field of Classification Search
CPC ............. H04W 72/0453; H04W 16/14; H04W 72/04; H04W 72/23; H04W 24/02;
(Continued)

(56) References Cited

U.S. PATENT DOCUMENTS 6,104,700 A * 8/2000 Haddock ............. H04L 47/2441 370/429
6,408,005 B1 * 6/2002 Fan .................... H04L 12/5602 370/468
8,270,292 B2 9/2012 Riemer et al.
8,681,614 B1 3/2014 Mccanne et al.
2002/0143939 A1 * 10/2002 Riddle .................. H04L 43/026 709/224
(Continued)

FOREIGN PATENT DOCUMENTS

DE 102019208515 A1 12/2020
EP 2852237 A1 3/2015
WO 2007147700 A1 12/2007

*Primary Examiner* — Sai Aung
(74) *Attorney, Agent, or Firm* — Laurence A Greenberg; Werner H. Stemer; Ralph E. Locher

(57) ABSTRACT

A method, a track-bound vehicle, and a system for controlling the transmission of data between the track-bound vehicle and a land-based facility. The transmission is improved by assigning the data to be transmitted in each case to a plurality of classes of traffic. A class bandwidth, which is provided for the transmission of data, is determined at defined time intervals for each class of traffic based on a total bandwidth that is available for the transmission of data.

9 Claims, 5 Drawing Sheets

(51) Int. Cl.

| | |
|---|---|
| ***H04L 41/0896*** | (2022.01) |
| ***H04L 43/0876*** | (2022.01) |
| ***H04L 47/24*** | (2022.01) |
| ***H04L 47/83*** | (2022.01) |
| ***H04L 67/12*** | (2022.01) |
| ***H04W 4/42*** | (2018.01) |

(52) U.S. Cl.
CPC .......... *H04L 43/0876* (2013.01); *H04L 67/12* (2013.01); *H04W 4/42* (2018.02)

(58) Field of Classification Search
CPC ........ H04W 72/56; H04L 47/24; H04L 47/10; H04L 47/50; H04L 47/70; H04L 47/20
See application file for complete search history.

(56) References Cited

U.S. PATENT DOCUMENTS

| | | | | |
|---|---|---|---|---|
| 2003/0005112 | A1* | 1/2003 | Krautkremer | H04L 41/0213 709/224 |
| 2003/0064681 | A1* | 4/2003 | Uedo | H04W 74/04 455/3.06 |
| 2003/0189934 | A1* | 10/2003 | Jeffries | H04L 47/805 370/468 |
| 2004/0010592 | A1* | 1/2004 | Carver | H04L 47/808 709/226 |
| 2007/0237160 | A1* | 10/2007 | Natarajan | H04L 45/02 370/395.5 |
| 2010/0008379 | A1* | 1/2010 | Yoo | H04Q 11/0067 370/468 |
| 2021/0385137 | A1* | 12/2021 | Sridhar | H04L 47/2441 |
| 2022/0361257 | A1 | 11/2022 | Porsch | |

* cited by examiner

METHOD AND SYSTEM FOR CONTROLLING A TRANSMISSION OF DATA ASSIGNED TO DIFFERENT CLASSES OF TRAFFIC

FIELD AND BACKGROUND OF THE INVENTION

The invention relates to a method and system for controlling a transmission of data between a track-bound vehicle and a land-based facility.

In principle, it is known that data is transmitted between a track-bound vehicle and a land-based facility (e.g. an operations control center). The operations control center can be located, for example, in a train station or in a signal box or it can be cloud-based in design. Different types of transmission (for example, radio, lights, etc.) are available for data transmission (also referred to as communication) between a vehicle and the land-based facility.

DE 10 2019 208 515 A1 describes a method for establishing a wireless data connection between a vehicle and an external unit. In the method, the vehicle checks in a test whether at least one condition of one or more predetermined condition(s) for establishing a connection is met. Further, it is proposed that, depending on the result of the test, a wireless data connection be established between the vehicle and the external unit for data transmission.

WO 2007/147700 describes a method for the transmission of data, in particular between a rail vehicle and an operations control center. When transmitting the data, the priority of the data for a sequence of transmissions is taken into account.

SUMMARY OF THE INVENTION

Against this background, it is the object of the invention to improve the control of the transmission of data.

This object is achieved by a method for controlling the transmission of data between a track-bound vehicle and a land-based facility in which the data to be transmitted is assigned in each case to one of a plurality of classes of traffic. A class bandwidth, which is provided for the transmission of data, is determined at regular temporal intervals for each class of traffic. The class bandwidth provided is determined on the basis of a total bandwidth available for the transmission of data.

The invention is based on the knowledge that track-bound vehicles are equipped with facilities for remote data transmission. These facilities are often referred to as routers, which are usually equipped with a radio modem. A communication link to a target system is established via a mobile network (e.g. LTE: Long Term Evolution). Different data is transmitted via this communication link. For example, operationally relevant data (for example, warnings) is preferred (prioritized) over data which serves a convenience function. Against this background, it is desirable to classify required data traffic and to control priority during transmission.

The invention is based on the further knowledge that previous systems assign the bandwidth in absolute terms (i.e. in bit/s) to a class of traffic. As the quality or the properties of the mobile radio connection frequently change during a journey of the track-bound vehicle, this will have an impact on the total bandwidth available for data transmission.

Previous solutions provide for dedicated radio connections to be used for corresponding classes of traffic. Alternatively or in addition, in previous solutions, the mobile communications infrastructure is upgraded. In addition, special agreements were concluded with mobile network operators in order to achieve the preferred transmission of data between the vehicle and the land side. Even the establishment of a private infrastructure along the route was carried out in previous solutions. All these solutions have in common that different technical measures are intended to increase the total bandwidth available for the transmission of data between the vehicle and the land side. No adjustment will be made to the total bandwidth currently available.

The solution according to the invention rectifies these problems by determining the class bandwidth provided for each class of traffic at regular temporal intervals based on the total bandwidth which is available for the transmission of data. In this manner, a total bandwidth which changes during the journey of the track-bound vehicle is taken into account in order to assign the class bandwidth provided for the transmission of data of this class of traffic to the respective classes of traffic.

The determination of the class bandwidth provided for the transmission of data is preferably carried out by means of a communication facility. The communication facility May comprise a communication facility of the vehicle, in particular a mobile communication gateway (MCG). Alternatively or in addition, the communication facility may comprise a communication facility of the land-based facility, in particular a ground communication gateway.

The transmission of data is preferably controlled via a network interface unit (for example, a network card) based on the determined class bandwidths by means of a traffic control facility of the mobile communication gateway. The data transmission between the track-bound vehicle and the land-based facility is therefore preferably carried out by means of the communication facility. The communication facility preferably has a transmission unit (e.g. the network card) and a receiving unit. In the case of data transmission from the track-bound vehicle to the land-based facility, the transmission unit is arranged on the track-bound vehicle and the receiving unit is arranged on the land side. In the case of reverse data transmission from the land-based facility to the track-bound vehicle, the transmission unit is arranged on the land side and the receiving unit is arranged on the track-bound vehicle.

The track-bound vehicle is preferably a rail vehicle, for example a multiple unit.

The person skilled in the art understands the wording "between a track-bound vehicle and a land-based facility" to mean that data can be transmitted from both the vehicle on the land side as well as from the land-based facility to the vehicle. In other words, both directions of data transmission are covered by the wording "between a track-bound vehicle and a land-based facility".

According to a preferred embodiment of the method according to the invention, a bandwidth provided for the transmission of data is determined on the basis of the total bandwidth which is available for the transmission of data. The class bandwidth provided includes an absolute class bandwidth. The absolute class bandwidth is determined on the basis of a relative proportion of the provided bandwidth assigned to each class of traffic and on the basis of the provided bandwidth.

This embodiment represents a particularly suitable way of determining the class bandwidth based on the total bandwidth available. The relative proportions assigned to the classes of traffic create the possibility of giving particular classes of traffic priority over other particular classes of traffic during transmission. The assignment of relative proportions has the further advantage that a prioritization of data can be configured or projected even before a communication runtime without knowledge of the total bandwidth available during the runtime.

The bandwidth provided is preferably established for a predetermined period in the future and is further preferably less than or equal to a total bandwidth expected for this predetermined period. For example, the current total bandwidth available for transmission is determined and on this basis the total bandwidth available for the predetermined period will be estimated in the future. Based on this estimate, the bandwidth provided is established such that it is less than or equal to the expected total bandwidth during the predetermined period in the future.

A prioritization of the classes of traffic preferably takes place as follows: If the total bandwidth falls below the bandwidth provided for this period during a period, the class bandwidth provided is first reduced for a class of traffic. In this manner, the remaining classes of traffic are prioritized over the class of traffic whose class bandwidth will be reduced. Further, preferably a sequence of classes of traffic can be predefined for the reduction of the associated class bandwidth and, in this way, a prioritization of the classes of traffic can take place.

The embodiment is particularly suitable for the encrypted transmission of data via the communication link between the vehicle and the land-based facility. This is because the assignment of the class bandwidths on the basis of the relative proportions already prioritizes the transmission of data on the side of the transmitting facility (e.g. the track-bound vehicle). The data which is encrypted for actual transmission via the communication link (i.e. after the control of the transmission based on the class bandwidths), does not require separate prioritization. This is particularly advantageous as the prioritization of encrypted data is often associated with effort: because information, such as certain properties or assigned classes of traffic, cannot usually be retrieved from the encrypted data (due to encryption).

According to a further preferred embodiment of the method according to the invention, the total bandwidth available is determined on the basis of a measurement carried out at regular intervals, of a data transmission rate of data which is transmitted between the track-bound vehicle and the land-based facility.

By measuring the data transmission rate at regular intervals, the class bandwidths can be adapted to the currently available conditions in a particularly suitable manner during the runtime of the track-bound vehicle.

In an advantageous development of this embodiment, the determination comprises measuring a free bandwidth. This free bandwidth is a bandwidth which, in addition to a bandwidth used for the transmission of a user data stream, remains until the total bandwidth is exhausted. The user data stream comprises the data transmitted with the class bandwidths.

In this manner, it is particularly easy to determine which total bandwidth is currently available for the transmission of data.

The term user data stream is to be understood as meaning that during a time interval monitoring takes place of the bandwidth with which the data to which the class bandwidths are assigned is actually transmitted. The free bandwidth therefore represents a bandwidth which can be added to the bandwidth used for the transmission of the user data until the total bandwidth is exhausted.

According to a further advantageous development, a measurement data stream is generated by means of a data generator facility. The measurement data stream is added to the user data stream during the transmission of data. The free bandwidth is measured on the basis of the measurement data stream.

The use of the measurement data stream represents a particularly skillful and suitable possibility for measuring the free bandwidth.

For example, a transmission rate of the measurement data stream generated by means of the data generator facility is measured. In addition, a receive rate of a measurement data stream which is generated by means of a data generator facility on the opposite side of the communication link can be measured.

While the measurement data stream is added to the user data stream during the transmission of data, the highest possible number of data packets of the measurement data stream to be transmitted is preferably sought in order to achieve a utilization of the available total bandwidth and in this way to determine the free bandwidth.

According to a further preferred development, the data generator facility comprises an on-board data generator facility and a land-based data generator facility.

In this manner, a measurement data stream can be generated both by the on-board data generator facility and by the land-based data generator facility. For example, the measurement data stream generated by the land-based data generator facility is received by a measurement facility of the track-bound vehicle. In this manner, a receive rate of the measurement data stream originating from the land-based data generator facility can be measured.

According to a further preferred embodiment of the method according to the invention, the data to be transmitted is in each case assigned to one of a plurality of classes of traffic as a function of at least one property of the data.

The at least one property comprises a source and/or destination address of the data to be transmitted. Thus, for example, on the basis of the source address of the data to be transmitted, it can be concluded that the data has a certain criticality and is accordingly assigned to a certain class of traffic.

Alternatively or in addition, the at least one property comprises a source and/or destination port of the data to be transmitted. Thus, for example, the source port of a switch to which a terminal device transmitting the data is connected can be used to determine the class of traffic to which the data is to be assigned.

Alternatively or in addition, the at least one property comprises a source and/or destination communication protocol used for transmission of the data. This is particularly expedient because the type and criticality of the data can frequently be inferred from the protocol used for the transmission of data and a decision can be made accordingly as to the class of traffic to which the data is to be assigned.

Alternatively or in addition, the at least one property comprises a criticality of the data to be transmitted. The term "criticality" is preferably to be understood as the importance of the data. Data with high criticality is, in particular, data, the loss of which poses a risk. The risk may be, for example, a risk to the safety of the track-bound vehicle and the environment of the track-bound vehicle. The criticality can be determined, for example, on the basis of an attribute which characterizes the data and is assigned to and/or entered in the file as meta data.

Accordingly, data whose loss or failure of transmission has no further significance has a low criticality. An example is data that serves a convenience function. In addition, data, the loss of which means that data relevant to passengers cannot be updated on the vehicle, for example on a passenger information system, has a low criticality.

Data which originates from diagnostic systems and serves to prepare maintenance processes for the vehicle during the next depot stop has a high criticality. In addition, data with the help of which billing data is generated in land-based systems has a high level of criticality. Examples of this are data derived from check-in/check-out systems, passenger counting systems and/or energy metering systems.

Alternatively or in addition, at least one property comprises an average proportion of the data in a total amount of data regularly provided for transmission. In other words, the average proportion does not relate to the relative proportion described above, but to the proportion of that data in a total amount of data which is regularly provided for transmission.

The invention also relates to a computer program product comprising commands which, when the program is executed by a calculation facility, induces it to carry out the method of the type described above.

The invention also relates to a provision apparatus for the computer program product of the type described above, the provision apparatus storing and/or providing the computer program product. The provision apparatus is, for example, a storage unit which stores and/or provides the computer program product. Alternatively and/or in addition, the provision apparatus is, for example, a network service, a computer system, a server system, in particular a distributed, for example, cloud-based computer system and/or virtual computer system, which stores and/or provides the computer program product, preferably in the form of a data stream.

Provision is in the form of a program data block as a file, in particular as a download file, or as a data stream, in particular as a download data stream, of the computer program. However, this provision can also take place, for example, as a partial download consisting of several parts. Such a computer program is read into a system using the provision apparatus, for example, so that the method according to the invention is carried out on a computer.

The invention also relates to a track-bound vehicle for controlling the transmission of data between the track-bound vehicle and a land-based facility. The track-bound vehicle comprises a calculation facility which is set up to assign the data to be transmitted in each case to one of a plurality of classes of traffic. The track-bound vehicle also comprises a bandwidth control facility which is set up to determine, for each class of traffic at regular temporal intervals, a class bandwidth provided for the transmission of data on the basis of a total bandwidth available for the transmission of data.

The invention also relates to a system for controlling the transmission of data between a track-bound vehicle and a land-based facility. The system comprises a calculation facility which is set up to assign the data to be transmitted in each case to one of a plurality of classes of traffic. The system also comprises a bandwidth control facility which is set up to determine, for each class of traffic at regular temporal intervals, a class bandwidth provided for the transmission of data on the basis of a total bandwidth available for the transmission of data.

For advantages, embodiments and details of embodiments of the computer program product according to the invention, the provision apparatus according to the invention, the track-bound vehicle according to the invention and the system according to the invention, reference can be made to the above description of the corresponding features of the method according to the invention.

BRIEF DESCRIPTION OF THE FIGURES

Exemplary embodiments of the invention are explained on the basis of the drawings. The drawings show.

DETAILED DESCRIPTION OF THE INVENTION

Figure 1:
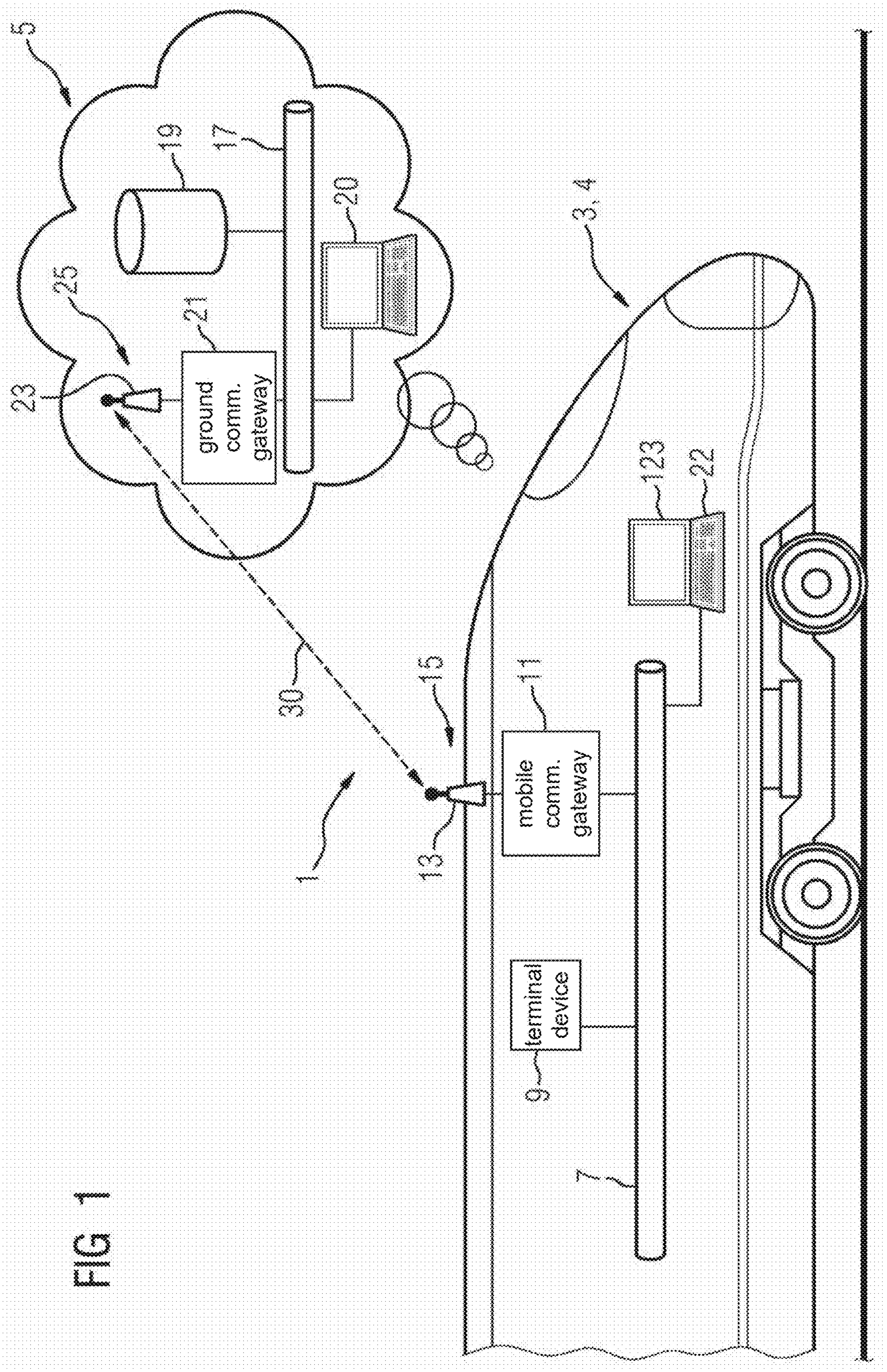
FIG. 1A diagrammatic view of the construction of a system according to the invention with a track-bound vehicle and a land-based facility, FIG. 2A diagrammatic view of the sequence of an exemplary embodiment of a method according to the invention, FIG. 3A diagrammatic view of the construction of an exemplary embodiment of a mobile communication gateway and a ground communication gateway, FIG. 4A diagram which shows an exemplary chronological sequence of a total bandwidth and FIG. 5A diagrammatic view of an exemplary embodiment of a dependency between a property and a relative proportion.

FIG. 1 shows a diagrammatic view of a system 1 with a track-bound vehicle 3 and a land-based facility 5.

The track-bound vehicle 3 is a rail vehicle 4, for example a subway. The land-based facility 5 is part of an operations control center.

The track-bound vehicle 3 has a communication network 7, which is designed as an Ethernet network. For example, a terminal device 9 and an input facility 22, which comprises a calculation facility 123, are connected to the communication network 7 in terms of data. The terminal device 9 is, for example, part of a subsystem of the track-bound vehicle 3 and is designed to transmit data for transmission to the land-based facility 5 via the communication network 7. In addition, a mobile communication gateway 11 is connected to the communication network 7, which is connected to a wireless communication interface 13. The mobile communication gateway 11, together with the wireless communication interface 13, forms a communication facility 15, which is designed to transmit data to the land-based facility 5 and to receive data from the land-based facility 5.

The land-based facility 5 has a communication network 17, which is designed as an Ethernet network. A server 19 and an input facility 20, for example, are connected to the communication network 17 in terms of data. In addition, a ground communication gateway 21 is connected to the communication network 17, which is connected to a wireless communication interface 23. The ground communication gateway 21, together with the wireless communication interface 23, forms a communication facility 25, which is designed to transmit data to the track-bound vehicle 3 and to receive data from the track-bound vehicle 3.

The communication facilities 15 and 25 together form a communication link 30 for transmitting data between the track-bound vehicle 3 and the land-based facility 5, i.e. originating from the track-bound vehicle 3 to the land-based facility 5 and originating from the land-based facility 5 to the track-bound vehicle 3.

Figure 2:
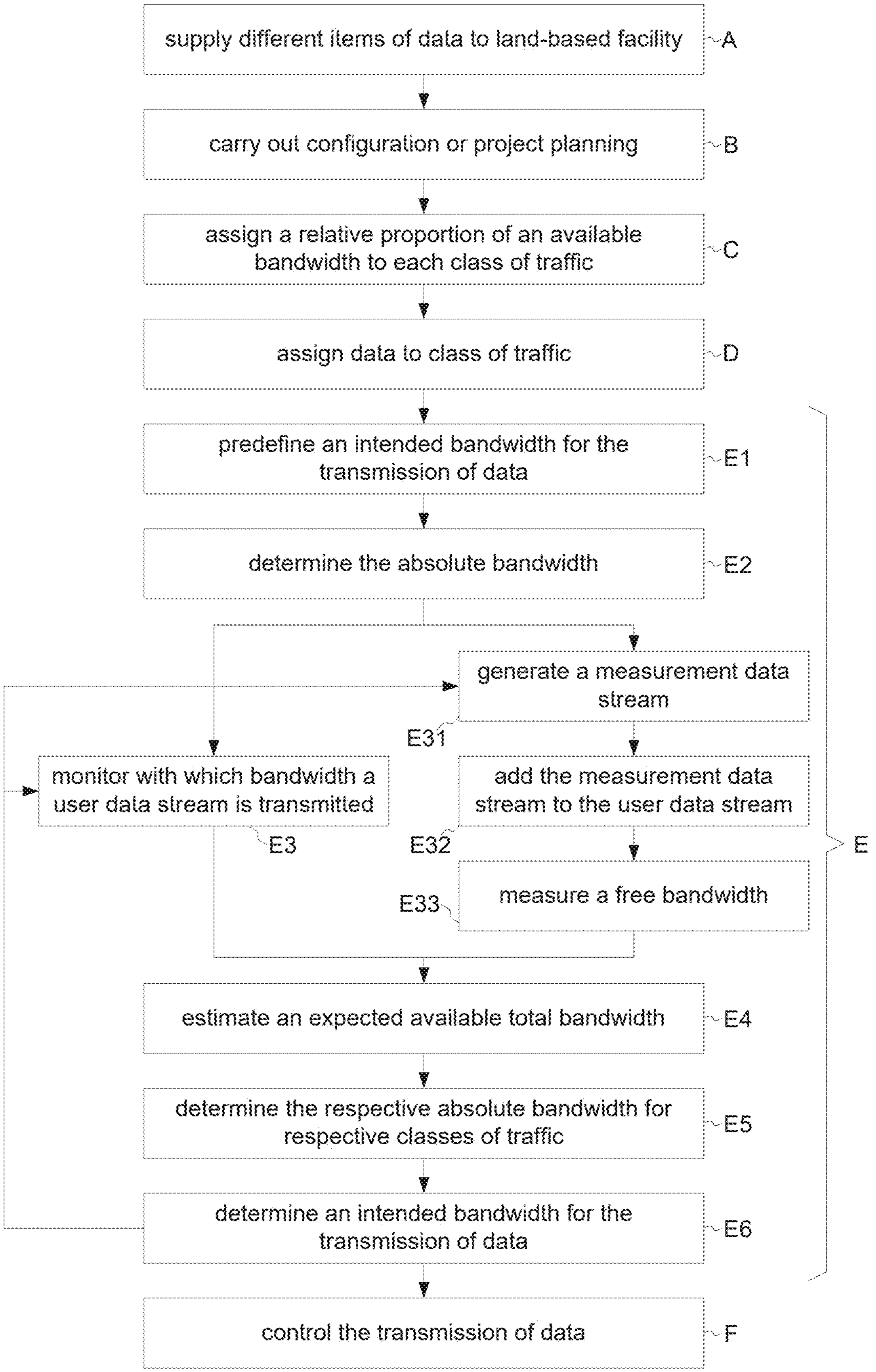
Figure 3:
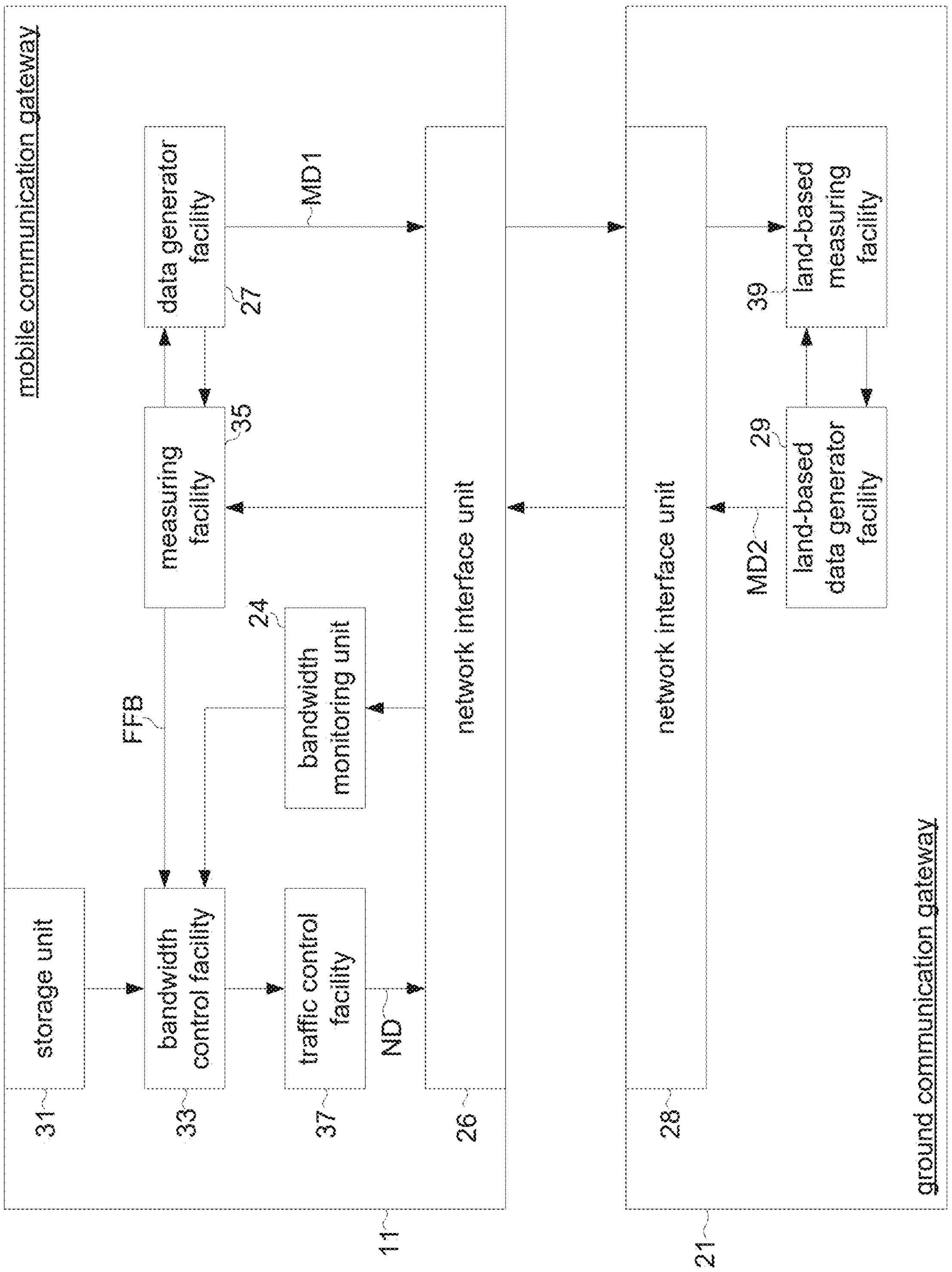
Figure 4:
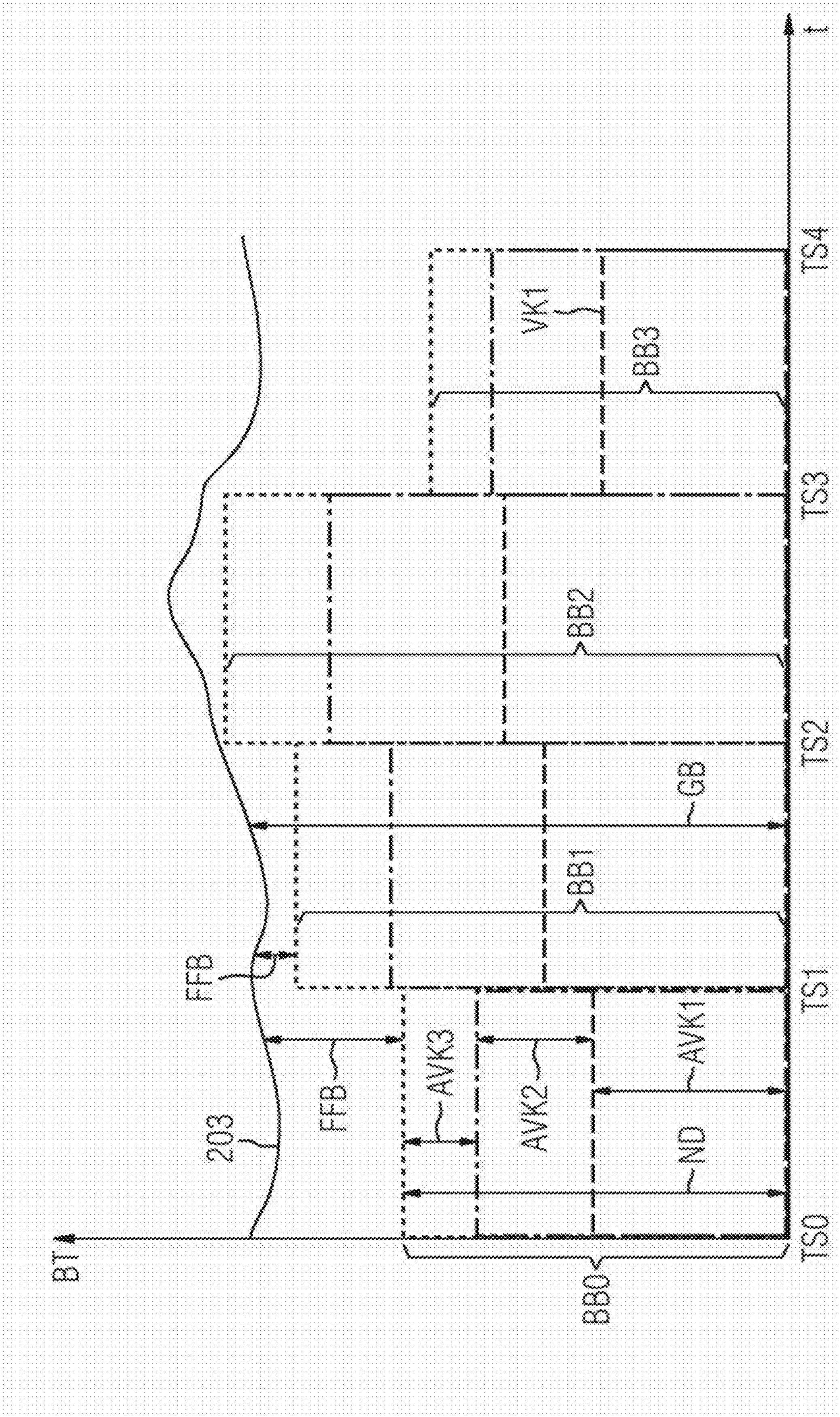

FIG. 2 shows a diagrammatic view of the sequence of an exemplary embodiment of the method according to the invention. FIG. 3 shows the structure of an exemplary embodiment of the mobile communication gateway 11 and the ground communication gateway 21. FIG. 4 shows a diagram which shows an exemplary chronological sequence of a total bandwidth GB during the runtime of the communication gateways 11 and 21.

In a method step A, different items of data which are supplied by different subsystems (facilities and/or systems) of the track-bound vehicle 3 are provided for transmission to the land-based facility 5. Thus, for example, data which is transmitted by the terminal device 9 during a runtime of the system 1 is provided for transmission to the server 19 of the land-based facility 5. The data has one property or a plurality of properties EG. An example of a property of the data is the source address. For example, if data is transmitted by the terminal device 9, it has the source address associated with the terminal device 9.

Figure 5:
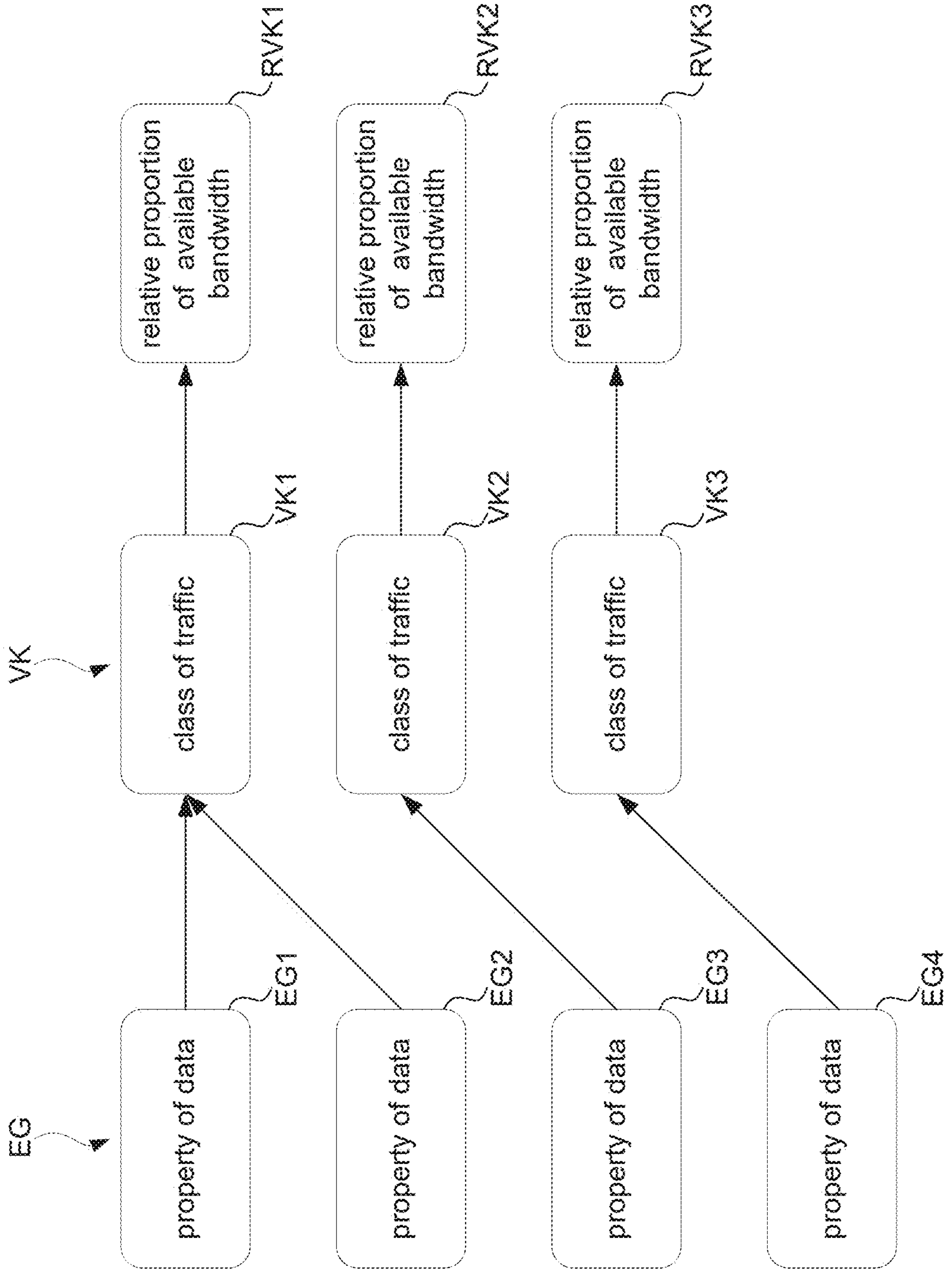

In a method step B, a configuration or project planning is carried out in which a number of n classes of traffic VK1 to VKn is defined. In a method step C, the data is assigned to a class of traffic VK on the basis of their properties EG. A single property can determine the assignment to a class of traffic VK or a plurality of properties EG of the data can be taken into account in the assignment. In addition, as part of the configuration or project planning, a relative proportion of an available bandwidth is assigned to each class of traffic in a method step D. For example, in the case of n=3 classes of traffic VK, a relative proportion of RVK1=50% of the available bandwidth is assigned to the class of traffic VK1, a relative proportion of RVK2=30% of the available bandwidth is assigned to the class of traffic VK2, and a relative proportion of RVK3=20% of the available bandwidth is assigned to the class of traffic VK3. The assignment described above is shown in a diagrammatic view in FIG. 5 and represents a constellation in which a single property EG1, EG2 or EG3 determines the assigned class of traffic VK1, VK2 or VK3. However, the invention is evidently applicable to a constellation in which a plurality of properties of the data determine the assignment to a class of traffic VK. In the example shown in FIG. 5, data with the property EG1 and EG2 is assigned to the class of traffic VK1, data with the property EG3 is assigned to the class of traffic VK2 and data with the property EG4 is assigned to the class of traffic VK3. The relative proportion RVK1, RVK2 or RVK3 is assigned to the class of traffic VK1, VK2 or VK3 respectively.

The configuration or project planning can be planned before a runtime of system 1, for example, by the operator of the vehicle 3 and carried out using the land-based input facility 20 in the form of a parameterization, which represents the configured or projected settings. Alternatively or in addition, this takes place using the on-board input facility 22, which comprises a calculation facility 123. The parameterization is loaded onto a storage unit 31 of the mobile communication gateway 11.

During the runtime of the mobile communication gateway 11, the determination of an intended class bandwidth is carried out on the basis of a total bandwidth available for the transmission of data according to a method step E:

FIG. 4 illustrates the chronological sequence of the total bandwidth GB in a diagrammatic representation. This sequence of the total bandwidth GB is shown as a curve 203, which represents the number of bits BT transmitted per unit of time BT compared to the time t. For an initial time TS0 during transmission, an intended bandwidth BB0 for the transmission of data is predefined in a method step E1.

On the basis of the predefined bandwidth BB0 and on the basis of the relative proportions RVK1, RVK2 and RVK3, the absolute bandwidth AVK1 is determined for the class of traffic VK1, AVK2 is determined for the class of traffic VK2, and AVK3 is determined for the class of traffic VK3 in a method step E2 and provided for the transmission of data within the subsequent period from TS0 to a time TS1.

During the period from TS0 to TS1, in a method step E3, bandwidth monitoring unit 24 monitors with which bandwidth BB a user data stream ND, which comprises the data of the different classes of traffic VK1, VK2 and VK3, is transmitted to the land-based facility 5 by means of a network interface unit 26. The network interface unit 26 is, for example, a network card of the mobile communication gateway 11. The bandwidth control facility 33 receives the monitored bandwidth BB from the bandwidth monitoring facility 24.

In a parallel method step E31, a measurement data stream MD1 is generated by means of a data generator facility 27. The measurement data stream MD1 is added to the user data stream ND during the transmission of the data of the classes of traffic VK1, VK2 and VK3 in a method step E32. In this case, the aim is to obtain the highest possible number of data packets for transmission from the measurement data stream MD1 in order to achieve utilization of the available total bandwidth GB. Thus, a transmission rate achieved for the measurement data stream MD1 is measured as the data transmission rate by means of a measuring facility 35 of the mobile communication gateway 11. The measuring facility 35 receives information about the transmission rate from the data generator facility 27. In addition, a receive rate at which the measurement data stream MD1 is received by a land-based measuring facility 39 of the ground communication gateway 21 can be measured. In addition, a receive rate of a received measurement data stream MD2 can be measured, which is generated by means of a land-based data generator facility 29 and transmitted via a network interface unit 28 of the ground communication gateway 21.

On the basis of the measurement data stream MD1 and/or MD2, a free bandwidth FBB is measured by means of the measuring facility 35 in a method step E33. The free bandwidth FBB represents a difference between the bandwidth BB used for the transmission of the user data ND and the available total bandwidth GB (curve 203 in FIG. 4). The bandwidth control facility 33 receives the determined free bandwidth FBB from the measuring facility 35.

On the basis of the bandwidth BB monitored by means of the bandwidth monitoring unit 24 and based on the determined free bandwidth FBB, an expected available total bandwidth GB is estimated in a method step E4 by means of a bandwidth control facility 33 for the period TS1 to TS2. On the basis of this estimate, in a method step E5, an intended bandwidth BB1 for the transmission of data during the period TS1 to TS2 is determined by means of the bandwidth control facility 33. For the determination of the intended bandwidth BB1, it is taken into account that the total bandwidth GB can decrease during the period TS1 to TS2. Accordingly, the intended bandwidth BB1 is provided, for example, with a blur buffer to the expected total bandwidth. A decreasing trend in the total bandwidth GB can also be taken into account when determining the intended bandwidth BB (see, for example, the decreasing trend of GB at TS3 and the correspondingly comparatively small, intended bandwidth BB3 in FIG. 4).

On the basis of specified intended bandwidth BB1 and the respective relative proportion RVK1, RVK2 or RVK3, the respective absolute bandwidth AVK1, AVK2 or AVK3 for the respective class of traffic VK1, VK2 or VK3 for transmission during the period TS1 to TS2 is determined in a method step E6. The transmission of data during the period TS1 to TS2 (according to a method step F) is controlled by means of the traffic control facility 37 via the network interface unit 26.

During the period TS1 to TS2, the method steps E3 to E6 and E31 to E6 are repeated in order to establish the intended bandwidth BB2 for the transmission of data during the period TS2 to TS3. During the period TS2 to TS3, the method steps E3 to E6 are repeated in order to establish a bandwidth BB3 for the transmission of data during the period TS3 to TS4.

A possibility for prioritizing the classes of traffic VK can be seen in FIG. 4. For example, if the total transmission rate GB falls below the intended bandwidth BB2 during the period TS2 to TS3, the class bandwidth AVK3 intended for the class of traffic VK3 is initially reduced. The classes of traffic VK1 and VK2 will then initially have the assigned class bandwidths AVK1 and AVK2 available. However, this event (i.e. the decrease in the total bandwidth GB below the intended bandwidth BB2) may be used as an opportunity to readjust the traffic control.

Although the invention has been illustrated and described in more detail by the preferred exemplary embodiment, the invention is not limited by the disclosed examples and other variations may be derived therefrom by a person skilled in the art without departing from the scope of the invention.

The invention claimed is:

1. A method for controlling a transmission of data between a track-bound vehicle and a land-based facility, the method comprising:
- assigning the data to be transmitted in each case to one of a plurality of classes of traffic;
- determining at regular time intervals a respective class bandwidth that is provided for the transmission of data for each class of traffic based on a total bandwidth that is available for the transmission of data; and
- determining the total bandwidth that is available based on measurements, performed at regular time intervals, of a data transmission rate of data transmitted between the track-bound vehicle and the land-based facility, and the determining step comprising measuring of a free bandwidth which remains in addition to a bandwidth used for the transmission of a user data stream until the total bandwidth is fully utilized; and
- the user data stream comprises the data transmitted with the class bandwidths.

2. The method according to claim 1, which comprises:
- determining a proposed bandwidth, which is provided for the transmission of data, based on the total bandwidth which is available for the transmission of data and
- wherein the class bandwidth comprises an absolute class bandwidth which is determined based on
  - a relative proportion of the proposed bandwidth assigned to each class of traffic; and
  - the proposed bandwidth.

3. The method according to claim 1, which comprises:
- generating the measurement data stream by a data generator facility; and
- adding the measurement data stream to the user data stream during the transmission of data; and
- measuring the free bandwidth on a basis of the measurement data stream.

4. The method according to claim 3, wherein the data generator facility comprises an on-board data generator facility and a land-based data generator facility.

5. The method according to claim 1, which comprises assigning the data to be transmitted in each case to one of a plurality of classes of traffic as a function of at least one property of the data selected from the group consisting of:
- a source and/or destination address of the data to be transmitted;
- a source and/or destination port of the data to be transmitted;
- a source and/or destination communication protocol used for the transmission of the data;
- a criticality of the data to be transmitted; and
- an average proportion of the data in a total amount regularly provided for transmission.

6. A non-transitory computer program product, comprising executable commands which, when executed by a calculation facility, cause the calculation facility to carry out the method according to claim 1.

7. A non-transitory program carrier for storing and/or providing a computer program product that includes executable commands which, when executed by a calculation facility, cause the calculation facility to carry out the method according to claim 1.

8. A track-bound vehicle for controlling a transmission of data between the track-bound vehicle and a land-based facility, comprising:
- a processor configured to assign the data to be transmitted in each case to one of a plurality of classes of traffic; and
- a mobile communication gateway having a bandwidth control facility configured to determine a class bandwidth provided for the transmission of data for each class of traffic at regular time intervals based on a total bandwidth that is available for the transmission of data; and
- wherein the total bandwidth that is available is determined based on measurements, performed at regular time intervals, of a data transmission rate of data transmitted between the track-bound vehicle and the land-based facility, and the determination of total bandwidth is based in part on a measurement of a free bandwidth which remains in addition to a bandwidth used for the transmission of a user data stream until the total bandwidth is fully utilized, and the user data stream comprises the data transmitted with the class bandwidths.

9. A system for controlling a transmission of data between a track-bound vehicle and a land-based facility, the system comprising:
- a processor configured to assign the data to be transmitted in each case to one of a plurality of classes of traffic; and
- a mobile communication gateway having a bandwidth control facility configured to determine a class bandwidth provided for the transmission of data for each class of traffic at regular time intervals based on a total bandwidth that is available for the transmission of data; and
- wherein the total bandwidth that is available is determined based on measurements, performed at regular time intervals, of a data transmission rate of data transmitted between the track-bound vehicle and the land-based facility, and the determination of total bandwidth is based in part on a measurement of a free bandwidth which remains in addition to a bandwidth used for the transmission of a user data stream until the total bandwidth is fully utilized, and the user data stream comprises the data transmitted with the class bandwidths.

* * * * *